United States Patent
Winter

(10) Patent No.: US 7,421,770 B1
(45) Date of Patent: Sep. 9, 2008

(54) METHOD OF REPLACING CANOPY SUPPORT COLUMNS

(75) Inventor: Neil S. Winter, Aiken, SC (US)

(73) Assignee: Enloe Aluminum, Inc., Aiken, SC (US)

( * ) Notice: Subject to any disclaimer, the term of this patent is extended or adjusted under 35 U.S.C. 154(b) by 0 days.

(21) Appl. No.: 11/738,091

(22) Filed: Apr. 20, 2007

Related U.S. Application Data

(60) Provisional application No. 60/794,774, filed on Apr. 25, 2006.

(51) Int. Cl.
*B23P 6/00* (2006.01)
(52) U.S. Cl. .................................. 29/402.08; 52/741.1
(58) Field of Classification Search ............... 52/741.1, 52/745.18; 14/26, 74, 77.1, 77.3; 29/402.01, 29/402.03, 402.08, 402.09, 402.11, 402.12, 29/402.14, 402.15, 402.18, 426.1, 426.4, 29/426.5, 897.31, 897.33, 897.35
See application file for complete search history.

(56) References Cited

U.S. PATENT DOCUMENTS

| | | | | |
|---|---|---|---|---|
| 3,911,548 A | * | 10/1975 | Perry | 29/402.12 |
| 4,033,080 A | * | 7/1977 | Fukushima | 52/223.4 |
| 4,301,565 A | * | 11/1981 | Weinbaum | 14/77.1 |
| 4,692,981 A | * | 9/1987 | Homes | 29/402.08 |
| 4,986,446 A | * | 1/1991 | Montgomery et al. | 222/94 |
| 5,022,134 A | * | 6/1991 | George | 29/402.08 |
| 5,088,263 A | * | 2/1992 | Horii et al. | 52/745.13 |
| 5,337,469 A | * | 8/1994 | Richey | 29/402.12 |
| 7,082,662 B2 | * | 8/2006 | Gauntt et al. | 29/402.08 |
| 2004/0187399 A1 | * | 9/2004 | Andree | 52/79.1 |
| 2005/0166379 A1 | * | 8/2005 | Gauntt et al. | 29/402.08 |
| 2006/0162275 A1 | * | 7/2006 | Storreosater | 52/726.1 |
| 2008/0006087 A1 | * | 1/2008 | Winter et al. | 73/584 |

* cited by examiner

*Primary Examiner*—Gay Ann Spahn
(74) *Attorney, Agent, or Firm*—Michael A. Mann; Nexsen Pruet, LLC

(57) ABSTRACT

A method for replacing a defective column that supports a service station canopy involves the use of several cranes. A pair of cranes supports the canopy while the defective column is being removed and the new column is being installed. A second crane assists in lifting the defective column clear of its foundation and in controlling it as it is lowered from its supporting position. The portion of the roof of the canopy surrounding the upper end of the defective column is cut away and a portion of the base of the service station concrete floor surrounding the lower end is removed to allow the defective column to be disconnected from the canopy frame and foundation, respectively. The defective column can then be removed and replaced while the pair of cranes supports the canopy. Once the new column is in place and re-connected to the foundation and frame, the base can be filled with concrete and the roof repaired.

6 Claims, 5 Drawing Sheets

METHOD OF REPLACING CANOPY SUPPORT COLUMNS

CROSS REFERENCE TO RELATED PATENTS

The priority benefit of U.S. provisional patent application Ser. No. 60/794,774, filed Apr. 25, 2006, is claimed.

BACKGROUND OF THE INVENTION

Canopies such as those above fuel dispensing pumps at service stations are typically formed of a horizontal framework supporting a roof and supported in turn above a raised concrete island by a plurality of hollow vertical steel columns. The roof of the canopy is flat. Typically, rain falling on the roof of the canopy drains through these hollow support columns. The lower end of each support column is embedded in concrete and includes an opening near or at its base for draining the accumulated rainwater. The water may be drained from the column either laterally through a hole in the column base, at the concrete level, down to a drainage pipe leading to an opening in the side of the concrete island, or into an underground drainage conduit that directs the water into a sewer or drainage field. These three drainage systems for the support columns are susceptible to becoming partially or completely clogged with leaves and other wind borne debris over time, thereby causing the column to retain water. Standing water in the column promotes rust and corrosion on its interior surface and results in structural deterioration. If the column becomes sufficiently weakened, the canopy will collapse. The typical repair method involves replacing the entire canopy and its supports or temporarily removing just the canopy, replacing the columns and then re-installing the canopy on the new columns. Both of these methods are expensive and time-consuming, requiring the site to be closed for several days during the repair. Therefore, a need exists for an efficient, low cost system for replacing rust-weakened canopy support columns.

SUMMARY OF THE INVENTION

The herein disclosed method of replacing canopy support columns generally includes the use of several cranes to remove just the support columns, one at a time, while holding the canopy in place or, at most, slightly elevated, in order to avoid having to move the entire canopy. Each weakened support column is removed and then replaced by a new support column before moving on to the next column.

The method includes the steps of:
(1) cutting the canopy roof deck proximate to the supported column to define an opening in the canopy around the upper end of the defective column;
(2) saw-cutting the concrete from around the base of a column;
(3) removing the cut concrete to form an opening in the concrete base around the defective column to expose the foundation to which the defective column is fastened;
(4) supporting the canopy roof with a first crane;
(5) connecting a second crane in a supporting relation to the upper end of the column;
(6) disconnecting the upper end of the defective column from the canopy;
(7) raising the canopy a short distance from the defective column with the crane;
(8) disconnecting the lower end of the defective column from its foundation;
(9) raising the defective column a short distance by the second crane
(10) swinging the lower end of the defective column clear of the foundation and out of the opening in the concrete base;
(11) using the second crane to control the lowering of the upper end of the defective column through the opening in the canopy while continuing to move the lower end of the column laterally thereby completing the removal of the deteriorated column;
(12) using the second crane to raise a replacement column to an upright position in which the upper end is in position in the opening in the canopy for reconnection to the frame supporting the canopy and the lower end of the replacement column is positioned in the opening in the concrete base on the foundation;
(13) securing the lower end of the new column to the foundation in the opening in the concrete base;
(14) lowering the canopy by the use of the first crane;
(15) securing the upper end of the replacement column to the canopy frame; and
(16) restoring the canopy roof deck around the newly installed column.

The advantage of this method is that it is much faster than either of the two prior art methods.

Other features and their advantages will become apparent to those skilled in the art of service station canopy system repair from a careful reading of the Detailed Description of Preferred Embodiments, accompanied by the drawings.

BRIEF DESCRIPTION OF THE DRAWINGS

In the drawings:
The method of replacing a canopy support column is illustrated in the accompanying drawings, in which.

DETAILED DESCRIPTION OF PREFERRED EMBODIMENTS

The present invention is a method for replacing canopy support columns for a service station canopy system. The method of replacing canopy support columns includes the steps of supporting the canopy with a pair of cranes, cutting the canopy around the column to be removed, disconnecting the upper end of the column from the canopy, raising the canopy a short distance from the column with one of the cranes, connecting a third crane in supporting relation to the upper end of the column, removing concrete from the concrete base around the lower end of the column, disconnecting the lower end of the column from its support base, raising the column a short distance, swinging the lower end of the column out of the opening previously made in the concrete base, using the third crane to lower the upper end of the column through the opening in the canopy while simultaneously moving the lower end of the column horizontally thereby completing removal of the deteriorated column. Then using the third crane to raise a replacement column to an upright position in which the upper end of the column is in position to connect it to the horizontal support beam structure of the canopy, securing the lower end of the new column to its support base, lowering the canopy by the use of the pair of cranes, securing the upper end of the replacement column to the horizontal canopy support beam structure and replacing the previously-removed section of canopy roof around the newly installed column.

Figure 1:
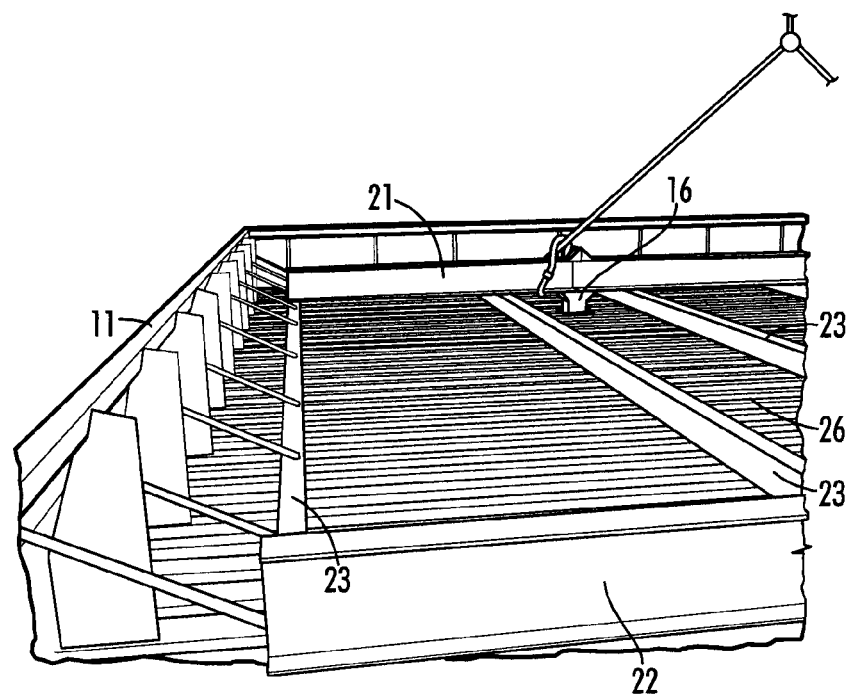
FIG. 1 is a illustration showing the top of the canopy and the support beams for its roof.
Figure 2:
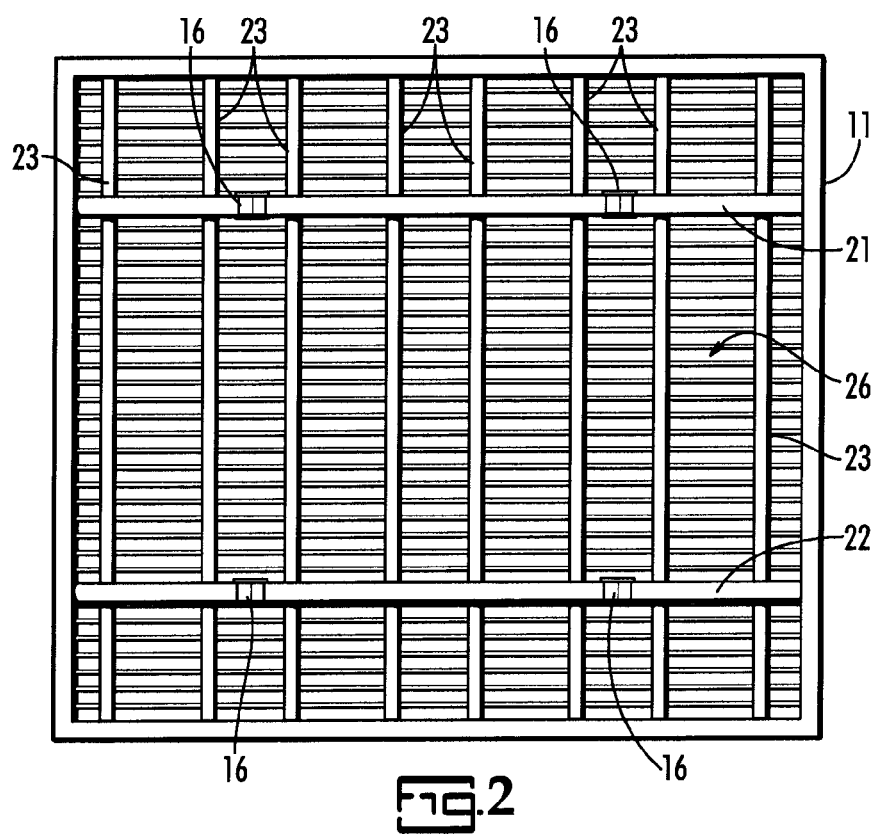
FIG. 2 is a top view of the canopy.

FIGS. 1 and 2 illustrate a prior art canopy 11 with frame made of I-beams 21, 22, and cross beams 23, to the undersides of which is suspended a roof 26. Supporting columns 16 are releasably secured to I-beams 21, 22. FIGS. 1 and 2 show four support columns 16 supporting canopy 11.

Figure 3:
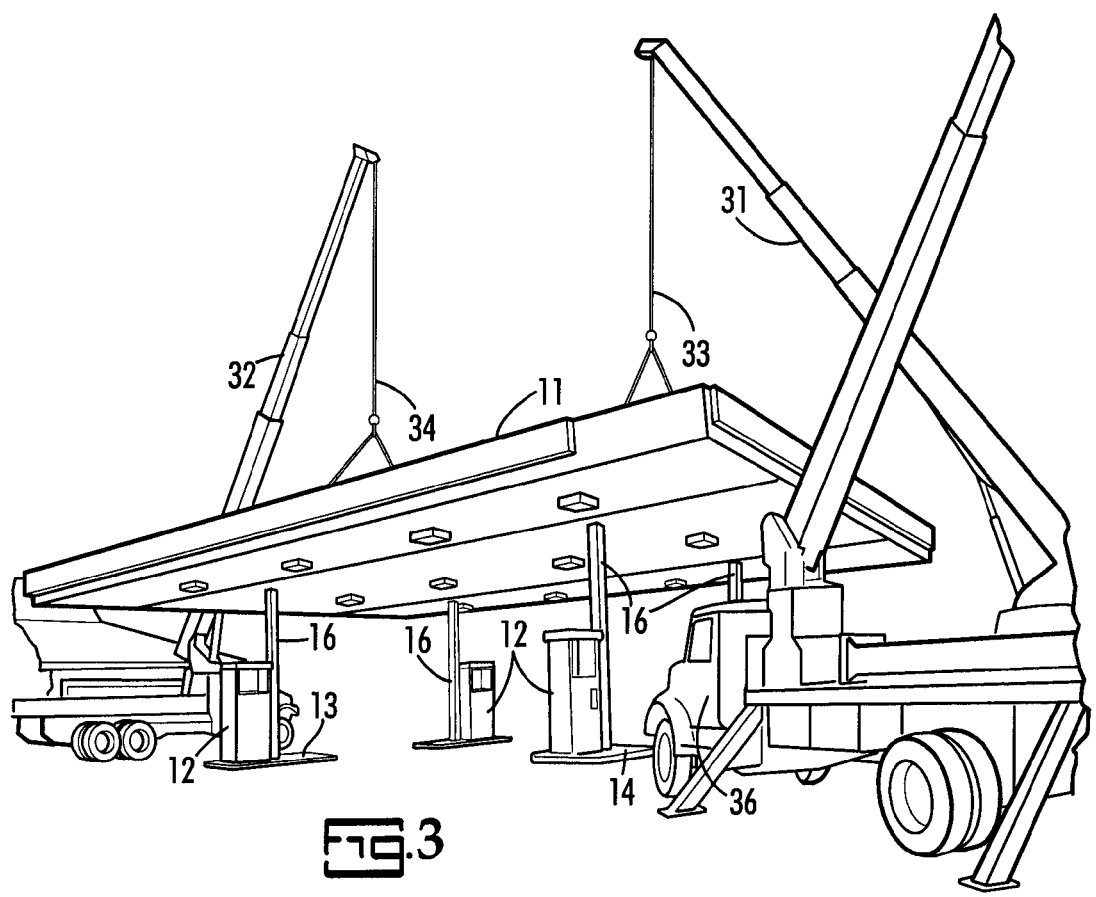
FIG. 3 is a illustration showing two mobile cranes positioned in supporting relation to a vehicle service station canopy and a third mobile crane in a waiting position.
Figure 4:
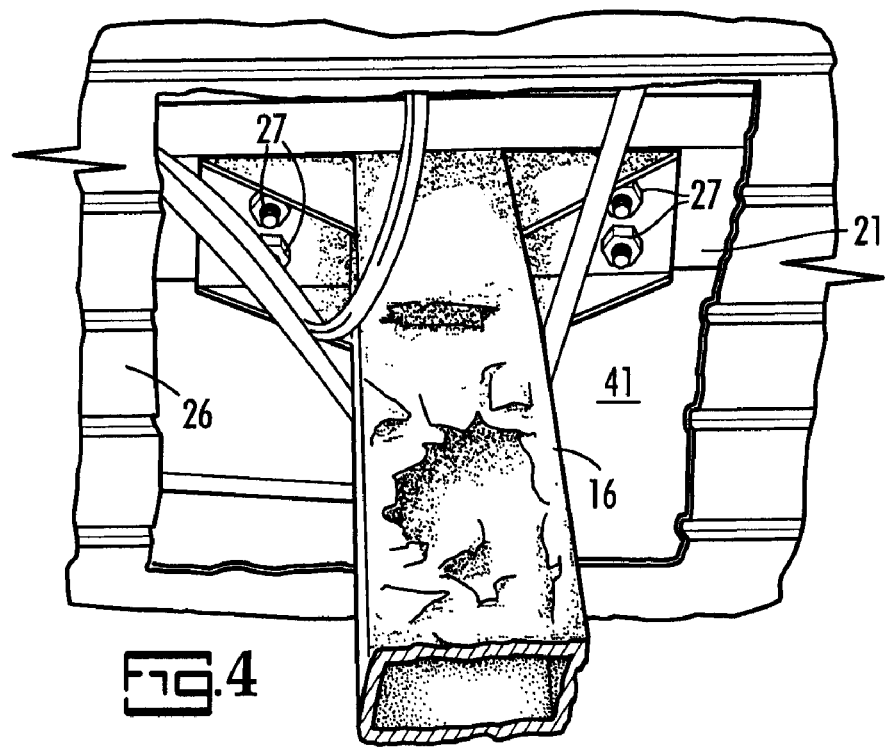
FIG. 4 is a illustration showing an opening cut in the canopy roof around the upper end of a column and a deteriorated upper end of the column.
Figure 5:
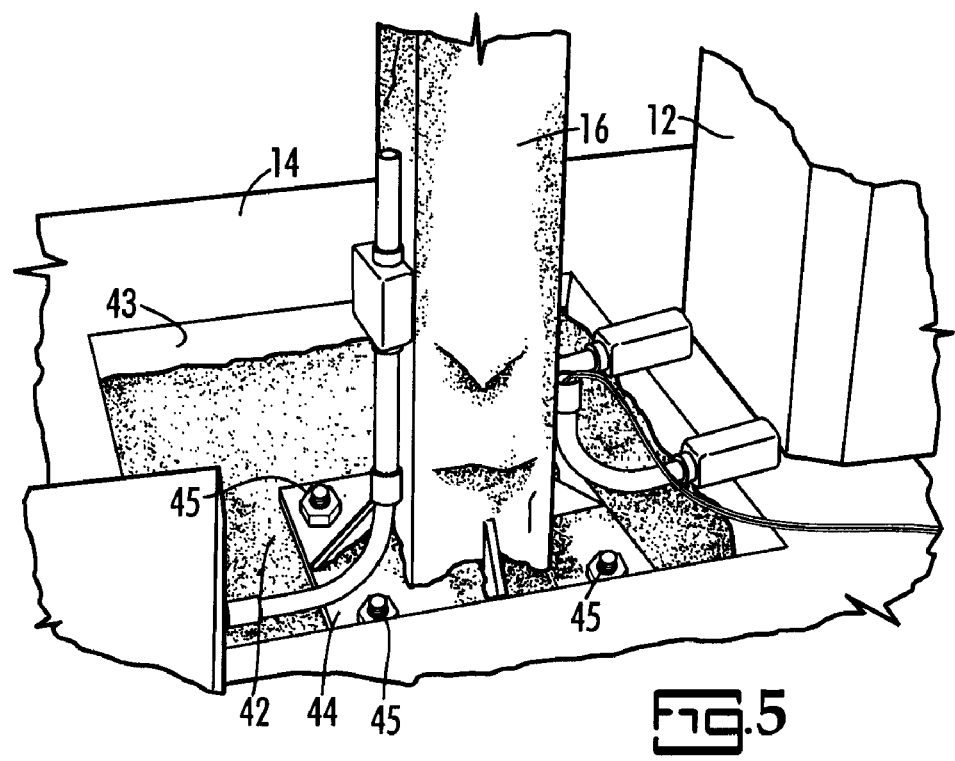
FIG. 5 is a illustration showing the lower end of the column and the opening cut in the concrete island.

Referring to FIG. 3, a service station is shown which includes canopy 11 above fuel dispensing modules 12 mounted on islands 13, 14. The canopy 11 in this example is supported by four hollow steel columns 16. As shown in FIGS. 1 and 2 the upper ends of the columns 16 are secured to the lower flanges of a pair of horizontally extending parallel I-beams 21, 22. The lower flanges of the I-beams 21, 22 are also secured by fasteners 27 to transversely extending parallel horizontal beams 23 which support a canopy roof 26. Initially a hole 41 is cut in the roof deck 26, as is illustrated in FIG. 4. Then, as illustrated in FIG. 5, an opening 43 is cut in the concrete island 14 around the base of column 16 and concrete is removed from around the lower end of the column 16 to expose the flange 44 on the lower end of the column and the removable fasteners 45 securing the flange 44 to a concrete foundation 42 embedded beneath the island 14. As shown in FIG. 3, the first and second truck mounted cranes 31, 32 have their respective lifting cables 33, 34 secured to two of the I-beams 21, 22, respectively. This constitutes the first step in our novel method of replacing a defective column 16. A third truck mounted crane 36 is in stand-by position.

Figure 6:
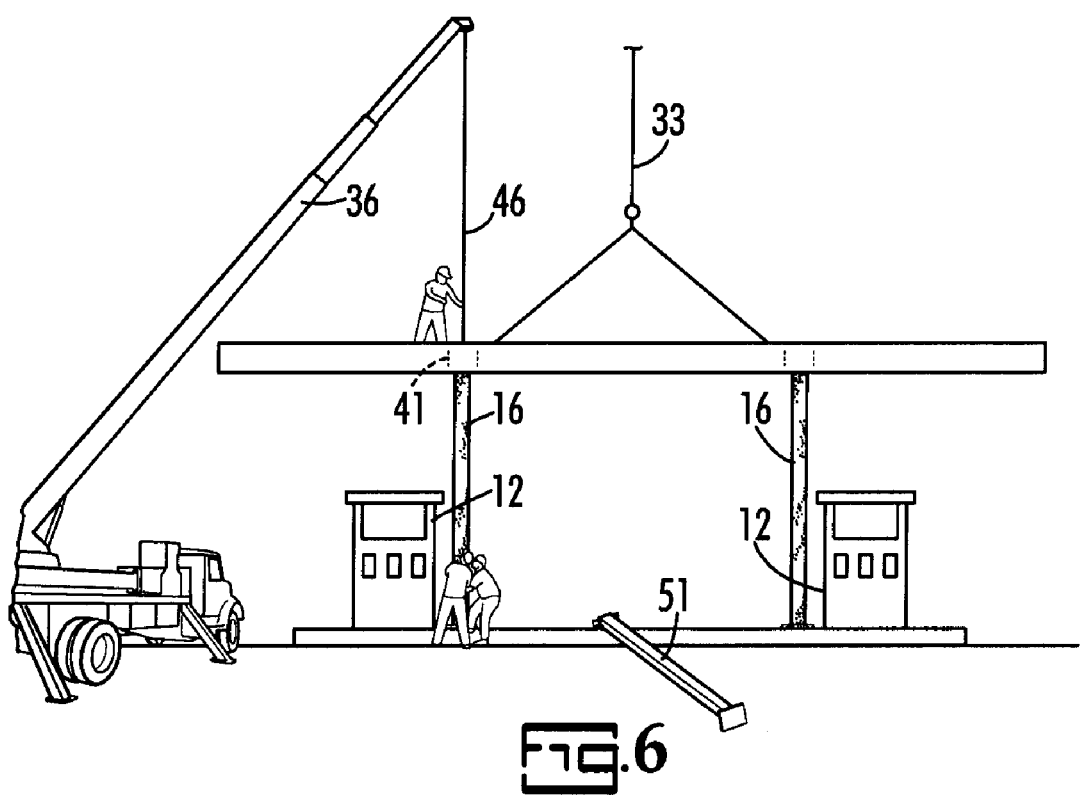
FIG. 6 is a illustration showing partial removal of the deteriorated support column.
Figure 7:
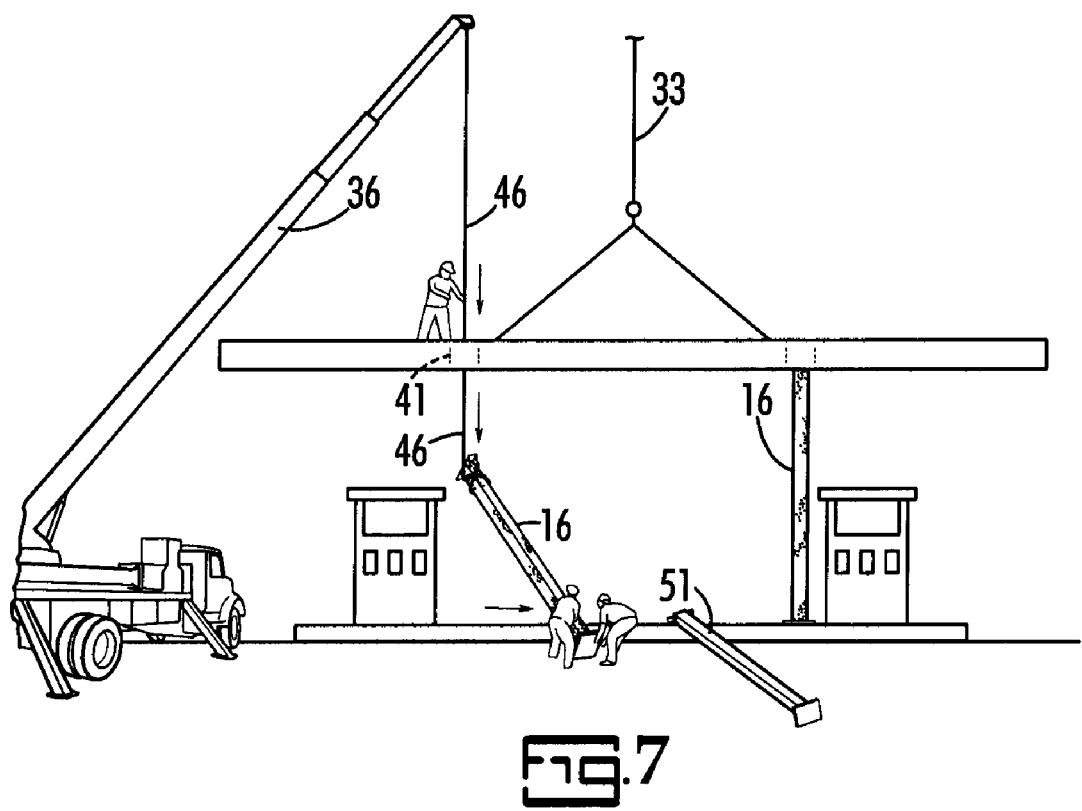
FIG. 7 is a illustration showing further removal of the deteriorated column.
Figure 8:
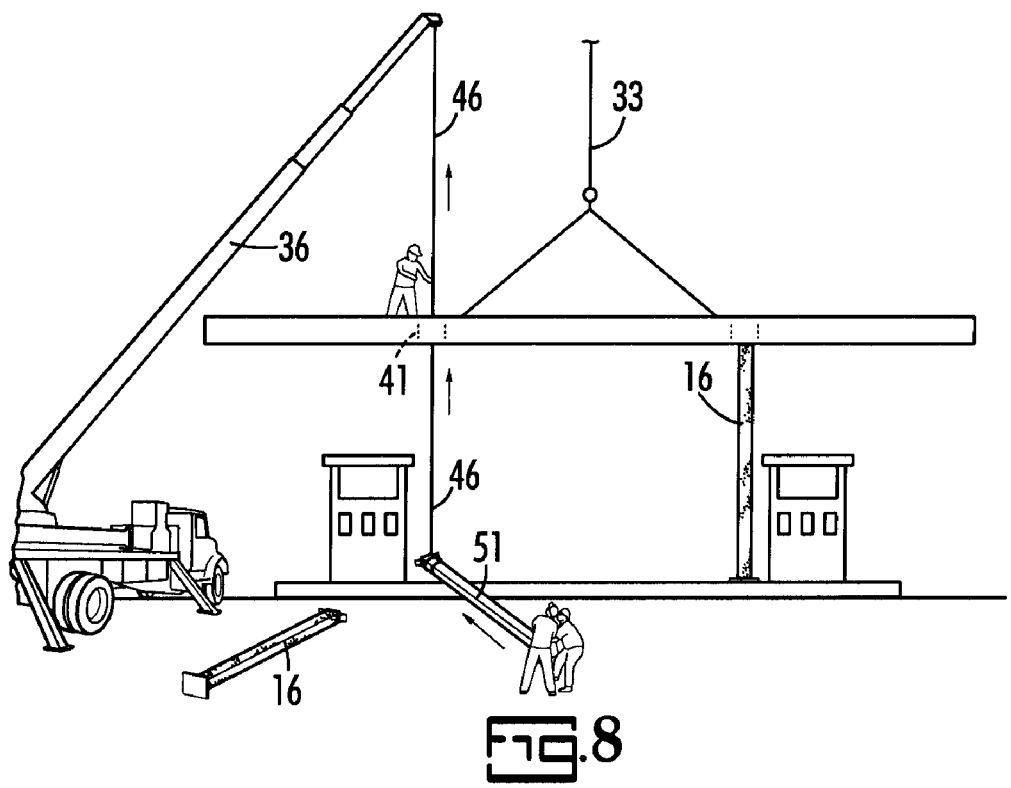
FIG. 8 is a illustration showing complete removal of the deteriorated column.

Once the canopy structure has been secured by the cranes, the removable fasteners 45, 27, at the lower end and upper end of column 16, respectively, can be disconnected. Typically the fasteners 45, are upstanding studs embedded in the concrete support foundation 42, which extend through openings in the flange, and nuts on the studs. The opening 43 is wide enough to facilitate the lower end of the column 16 being swung away from the fuel dispensing module 12 and out of the opening 43. All accessory items, such as electrical wiring, are removed from the support column 16 and the end of the canopy 11 supported by the column 16 being replaced is raised a few inches by the crane 31. This permits the third mobile crane 36 to raise the column 16 with its cable 46 sufficiently to lift the lower end of the column 16 off its mounting studs 45 and permit its lower end to be swung laterally out of the opening 43 cut in the island 14. As illustrated in FIGS. 6, 7 and 8, the lower end of the support column 16 can be manually swung and dragged away from the opening 43 and laid aside.

Figure 9:
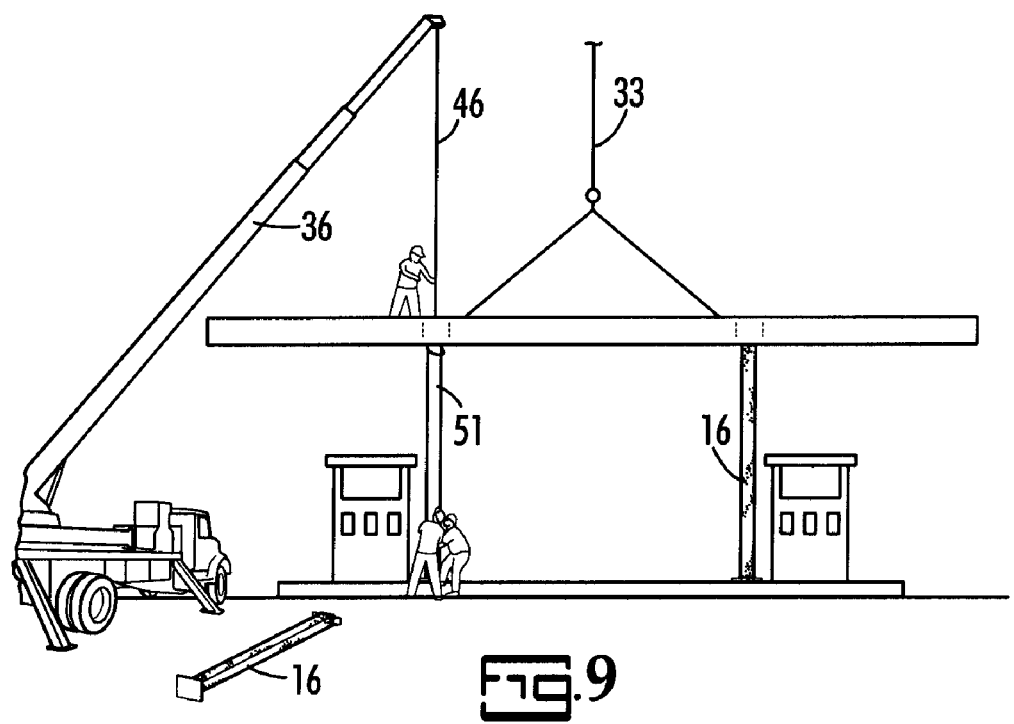
FIG. 9 is a illustration showing a replacement column being installed.

In the next step, the cable 46 of the third crane 36 is secured to the upper end of a replacement column 51 and the replacement column is raised so that its upper end extends through the opening 41 as shown in FIG. 9. The lower end of the replacement column is moved toward the opening 43 and reattached to foundation 42 using fasteners 45. The first crane 31 lowers the canopy 11 into supported relation on the new column 51 and I-beam 21 of the roof support structure is secured to the flange on the upper end of the new column 51.

After the new column 51 is in place, the roof deck around the column is replaced by attaching a new section of roofing to the existing deck around column 51, preferably by attaching the new section with screws and then caulking the seams. Then concrete is poured into opening 41 at the base of the new column 51 to secure it firmly in place.

The hereinbefore described procedure is followed in a similar manner in replacing the remaining support columns 16. In the event the lower end of the column 16 is supported so far below the associated island's top surface that it is not practical to raise the roof sufficiently to allow the lower end to be swung out of the opening cut in the island, the opening in the roof is preferably cut large enough to permit the defective column to be removed through the hole cut in the roof deck 26 and the new column likewise will be lowered through the hole in the roof.

It will be apparent to those skilled in the art of service station canopy system repair that many substitutions and modifications may be made to the foregoing method without departing from the spirit and scope of the present invention, defined by the appended claims.

What is claimed is:

1. A method for replacing a defective column that supports a service station canopy, said canopy including a horizontal framework and a roof, said service station canopy being supported by plural columns above a service station base, said method comprising the steps of:
    (a) cutting a hole in said roof of said service station canopy to form a roof opening around said defective column, said roof opening exposing a top end of said defective column and a releasable connection between said top end of said defective column and said horizontal framework;
    (b) forming a base opening in said service station base around a bottom end of said defective column, said base opening exposing said bottom end of said defective column and a releasable connection to a foundation;
    (c) lifting said canopy using at least one crane;
    (d) disconnecting said defective column from said releasable connections to said horizontal framework and to said foundation;
    (e) removing said defective column from said framework and said foundation;
    (f) fastening a new column to said framework and said foundation;
    (g) filling said base opening around said new column with material to cover said foundation around said new column; and
    (h) replacing roofing removed from said roof opening around said new column.

2. The method as recited in claim 1, wherein said removing step further comprises the step of lifting said defective column clear of said releasable connection to said foundation.

3. The method as recited in claim 1, wherein said removing step further comprises the step of lifting said defective column clear of said releasable connection to said foundation and through said roof opening.

4. The method as recited in claim 1, wherein said removing step further comprises the steps of:
    (a) lifting said defective column clear of said releasable connection to said foundation; and
    (b) lowering said defective column while moving said bottom end of said defective column laterally.

5. The method as recited in claim 1, further comprising the step, prior to the removing step, of lifting said framework of said canopy enough to allow said defective column to be removed from said foundation.

6. The method as recited in claim 5, wherein said lifting step is done using a pair of cranes.

* * * * *